(12) United States Patent
Filgas (10) Patent No.: US 9,405,127 B2
(45) Date of Patent: Aug. 2, 2016

(54) PLANAR WAVEGUIDE FARADAY ROTATOR

(75) Inventor: David M. Filgas, Newbury Park, CA (US)

(73) Assignee: RAYTHEON COMPANY, Waltham, MA (US)

( * ) Notice: Subject to any disclaimer, the term of this patent is extended or adjusted under 35 U.S.C. 154(b) by 417 days.

(21) Appl. No.: 12/925,184

(22) Filed: Oct. 14, 2010

(65) Prior Publication Data

US 2012/0093454 A1   Apr. 19, 2012

(51) Int. Cl.
| | | |
|---|---|---|
| G02B 6/10 | (2006.01) | |
| G02B 27/28 | (2006.01) | |
| G02B 6/126 | (2006.01) | |
| G02F 1/095 | (2006.01) | |
| G02F 1/09 | (2006.01) | |
| G02B 6/27 | (2006.01) | |

(52) U.S. Cl.
CPC .............. *G02B 27/286* (2013.01); *G02B 6/126* (2013.01); *G02B 6/2746* (2013.01); *G02F 1/093* (2013.01); *G02F 1/095* (2013.01); *G02F 2201/05* (2013.01); *G02F 2202/40* (2013.01); *G02F 2203/60* (2013.01)

(58) Field of Classification Search
CPC ........ G02F 1/095; G02F 1/093; G02B 6/2746
See application file for complete search history.

(56) References Cited

U.S. PATENT DOCUMENTS

| | | | |
|---|---|---|---|
| 4,746,182 A | | 5/1988 | Dammann et al. |
| 4,859,013 A | * | 8/1989 | Schmitt ................. G02F 1/0955 385/130 |
| 5,058,971 A | * | 10/1991 | Schmitt et al. ................. 385/11 |
| 5,175,787 A | * | 12/1992 | Gualtieri .................. G02B 6/02 385/130 |
| 5,245,689 A | * | 9/1993 | Gualtieri .................. G02B 6/02 385/142 |
| 2003/0161375 A1 | * | 8/2003 | Filgas et al. .................... 372/66 |

OTHER PUBLICATIONS

Dammann, et al., "Magneto-Optical Mode Conversion in Single-Mode Waveguides Using End-Fire Coupling", International Conference on Integrated Optics and Optical Fibre Communication (I00C) and European Conference on Optical Communication (ECOC). Venice, Oct. 1-4, 1986; International Conference on Integrated Optics and Optical Fibre Communication (IO, vol. CONF. 5, 11, Oct. 1, 1985, pp. 249-252.

Tolksdorf, et al., "Growth of Yttrium Iron Garnet Multi-Layers by Liquid Phase Epitaxy for Single Mode Magneto-Optic Waveguides", Journal of Crystal Growth, Elsevier, Amsterdam, NL, vol. 83, No. 1, May 1, 1987, pp. 15-21.

Wolfe, et al., Thin-Film Garnet Materials With Zero Linear Birefringence for Magneto-Optic Waveguide Devices (Invited), Journal of Applied Physics, American Institute of Physics, New York, US., vol. 63, No. 8, Part IIA, Apr. 15, 1988, pp. 3099-3103.

(Continued)

*Primary Examiner* — Michelle R Connelly
*Assistant Examiner* — Hoang Tran
(74) *Attorney, Agent, or Firm* — Lewis Roca Rothgerber Christie LLP (57) ABSTRACT

A planar core and a cladding disposed on opposite sides of thereof. In the best mode, the rotator includes a very low Numerical Aperture (NA) planar waveguide. The cladding is birefringent and the refractive index and birefringence thereof are optimized to provide equal mode propagation velocities for both TE and TM modes for at least one transverse mode. The refractive index and birefringence of the cladding are optimized to provide equal mode propagation velocities for both TE and TM modes for a wide range of transverse modes.

11 Claims, 6 Drawing Sheets

(56) References Cited

OTHER PUBLICATIONS

Extended European Search Report for European Application No. 11180665.9, Filed Sep. 9, 2011, Extended European Search Report dated Oct. 18, 2012 and mailed Oct. 29, 2012 (10 pgs.).

Egberto Munin, J A Roversi, and A Balbin Villaverde, Faraday Effect and Energy Gap in Optical Materials, J. Phys. D: Appl. Phys. 25, 1992, pp. 1635-1639, IOP Publishing Ltd.

Efim A. Khazanov, Faraday isolators and Faraday mirrors for high average power lasers, Institute of Applied Physics of Russian Academy of Science, N. Novgorod, Russia.

* cited by examiner

PLANAR WAVEGUIDE FARADAY ROTATOR

BACKGROUND OF THE INVENTION

1. Field of the Invention

The present invention relates to optical devices. More specifically, the present invention relates to Faraday rotators.

2. Description of the Related Art

Faraday rotators are used in laser systems to provide an optical isolator that allows light to travel in one direction and block light in the other direction. Optical isolators are useful in high power lasers to allow a low power laser to feed a high power amplifier and block the resulting high power beam from feeding back into the low power laser beam. This is particularly important in weapons class lasers inasmuch as these devices may operate at hundreds of kilowatt levels.

Faraday Rotators are a type of optical device that provides a non-reciprocal rotation of the polarization of a light beam passing through the Faraday Rotator. The non-reciprocity of the polarization rotation allows creation of an optical isolator by placing a Faraday rotator with a 45 degree rotation between a pair of polarizers whose axes are rotated by 45 degrees with respect to each other. Faraday isolators act as optical diodes allowing a signal to pass with low loss in one direction while creating a high attenuation for signals traveling in the reverse direction. Faraday rotators consist of an optical material with a high Verdet constant that is placed in a strong magnetic field. The Faraday effect causes light traveling along the direction of the magnetic field to experience polarization rotation.

Historically, use of Faraday rotators at high power levels (greater than a few 10s of watts) has been problematic because the optical materials used in Faraday rotators generally have some level of intrinsic residual absorption. At high average power levels, the heating due to this absorption in materials with useful Verdet constants causes a number of detrimental effects including thermal lensing: thermal gradients that lead to undesirable optical lensing effects, thermally induced stress birefringence, and thermally induced drift in the amount of rotation provided by the Faraday Rotator. These thermal effects degrade the effectiveness of the optical isolator, degrade the beam quality of the laser beam passing through the isolator, and/or result in optical damage to the isolator. Hence, there is a need for a means for managing the heat loads in Faraday rotators at high power levels in a way that minimizes these deleterious effects.

Prior efforts to develop Faraday rotators capable of high power operation have focused on minimizing intrinsic absorption in the optical medium, configuring the optical medium as a rectangular slab in order to improve cooling and reduce thermal gradients, and compensating for birefringence by using two 22.5 degree Faraday rotators with a 90 degree reciprocal rotator between the Faraday rotators similar to Scott-DeWitt compensation applied to correct for birefringence in laser rods. The combination of all of these approaches by Khazanov has yielded Faraday Isolators with power handling up to 2 kW at greater than 20 db extinction. Unfortunately, this approach leads to rather large isolators and is unlikely to scale to 10s of kW.

Hence, a need remains in the art for a Faraday rotator capable of operating at much higher power levels without performance degradation due to thermal gradients.

SUMMARY OF THE INVENTION

The need in the art is addressed by the Faraday rotator and method for rotation of the present invention. In a most general implementation, the inventive rotator includes a planar core and a cladding disposed on opposite sides of thereof. In the best mode, the rotator includes a very low Numerical Aperture (NA) planar waveguide. The cladding refractive index and/or birefringence are optimized to provide equal mode propagation velocities for both TE and TM modes for at least one transverse mode. Preferably, the refractive index and/or birefringence of the cladding are optimized to provide equal mode propagation velocities for both TE and TM modes for a wide range of transverse modes.

The inventive method for rotating a polarization state of a beam including the steps of: providing a planar core of a material with a non-zero Verdet constant; providing a cladding on opposite sides of said core; providing a magnetic field along the axis of the planar core; optimizing the refractive index and/or birefringence said cladding to provide equal mode propagation velocities for both TE and TM modes for at least one transverse mode; and inputting the beam into the core.

DESCRIPTION OF THE INVENTION

Illustrative embodiments and exemplary applications will now be described with reference to the accompanying drawings to disclose the advantageous teachings of the present invention:

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As discussed above in the Background of the Invention, Faraday Rotators are optical devices that provide a non-reciprocal rotation of the polarization of a light beam passing through the Faraday Rotator. The non-reciprocity of the polarization rotation allows creation of an optical isolator by placing a Faraday rotator with a 45° rotation between a pair of polarizers whose axes are rotated by 45° with respect to each other. Faraday isolators act as optical diodes allowing a signal to pass with low loss in one direction while creating a high attenuation for signals traveling in the reverse direction.

Figure 1:
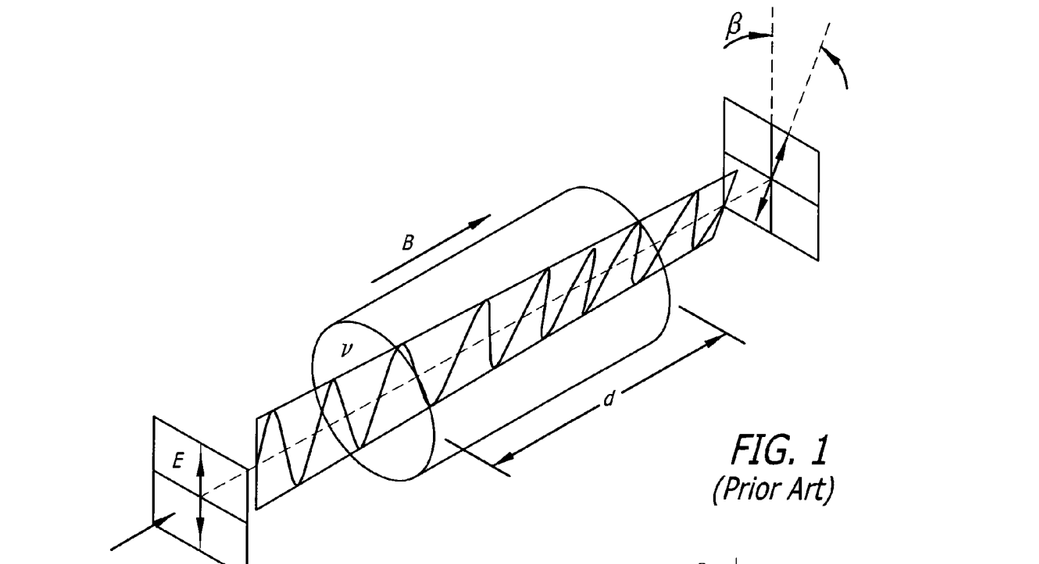
FIG. 1 is a simplified perspective view of a Faraday rotator in accordance with conventional teachings.

FIG. 1 is a simplified perspective view of a Faraday rotator in accordance with conventional teachings. (See http://en.wikipedia.org/wiki/Faraday_rotator and "Encyclopedia of Laser Physics and Technology" online at www.rp-photonics.com.) As is known in the art, Faraday rotators typically consist of an optical material with a high Verdet constant that is placed in a strong magnetic field. The Faraday effect causes light traveling along the direction of the magnetic field to experience polarization rotation. Historically, using Faraday rotators at high power levels (greater than a few 10's of Watts) has been problematic because the optical materials used in Faraday rotators generally have some level of intrinsic absorption. At high average power levels, the heating due to this absorption causes a number of detrimental effects including thermal lensing, thermally induced stress birefringence, and thermally induced drift in the amount of rotation provided by the Faraday Rotator. The present invention provides a means of managing the heat loads at high power levels in a way that minimizes these deleterious effects by configuring the optical medium as a Planar Waveguide (PWG).

The present invention minimizes any phase difference for TE and TM modes in a PWG Faraday rotator through the use of a low NA PWG or through the use of a birefringent cladding around the core. The refractive index and/or birefringence of the cladding are optimized to provide equal mode propagation velocities for both TE and TM modes for a wide range of transverse modes. When the phase difference for TE and TM waves in the PWG Faraday rotator is less than about 0.01 waves, a Faraday isolator utilizing the PWG Faraday Rotator will be able to provide high extinction at high laser power levels.

Figure 2:
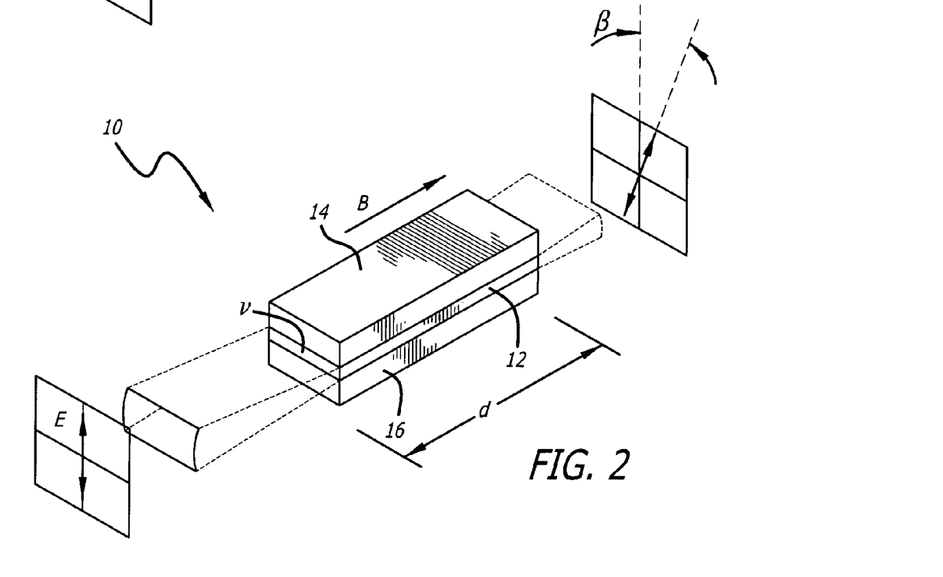
FIG. 2 is a simplified perspective view of a Faraday rotator implemented in a planar waveguide in accordance with an illustrative embodiment of the present teachings.

FIG. 2 is a simplified perspective view of a Faraday rotator implemented in a planar waveguide in accordance with an illustrative embodiment of the present teachings. In the best mode, the rotator 10 is a very low Numerical Aperture (NA) planar waveguide. As shown in FIG. 2, the rotator 10 comprises a planar core 12, an upper cladding 14 and a lower cladding 16. A magnetic field is applied along the optical axis of the PWG with a field strength optimized to provide a 45 degree rotation of the polarization of the propagating beam (an input TE or TM beam is converted to circular polarization after passing through the PWG Faraday Rotator). The end faces are coated with an antireflection coating at the laser wavelength.

In accordance with the present teachings, the upper and lower claddings 14, 16 are optimized to provide equal mode propagation velocities for both TE and TM modes for at least one transverse mode. Preferably, the refractive index and/or birefringence of the claddings are optimized to provide equal mode propagation velocities for both TE and TM modes for a wide range of transverse modes.

The core material for a PWG Faraday rotator would ideally have very low absorption, high thermal conductivity, and a high Verdet constant. Terbium-doped glasses provide good performance for low power applications, but for high power applications, the favored materials are TGG and Yttrium Aluminum Garnet (YAG). TGG has a much stronger Verdet constant than YAG meaning much weaker magnets and/or smaller crystal sizes are required to achieve the desired amount of rotation. YAG may, however, hold the highest power scaling limits due to it's 1.5× higher thermal conductivity and the availability of very high purity YAG with extremely low absorption levels, nearly 3 orders of magnitude less than TGG. Due to YAG's ~10× lower Verdet constant than TGG, a device with a YAG core would need to be longer and may require more powerful magnets.

Figure 3:
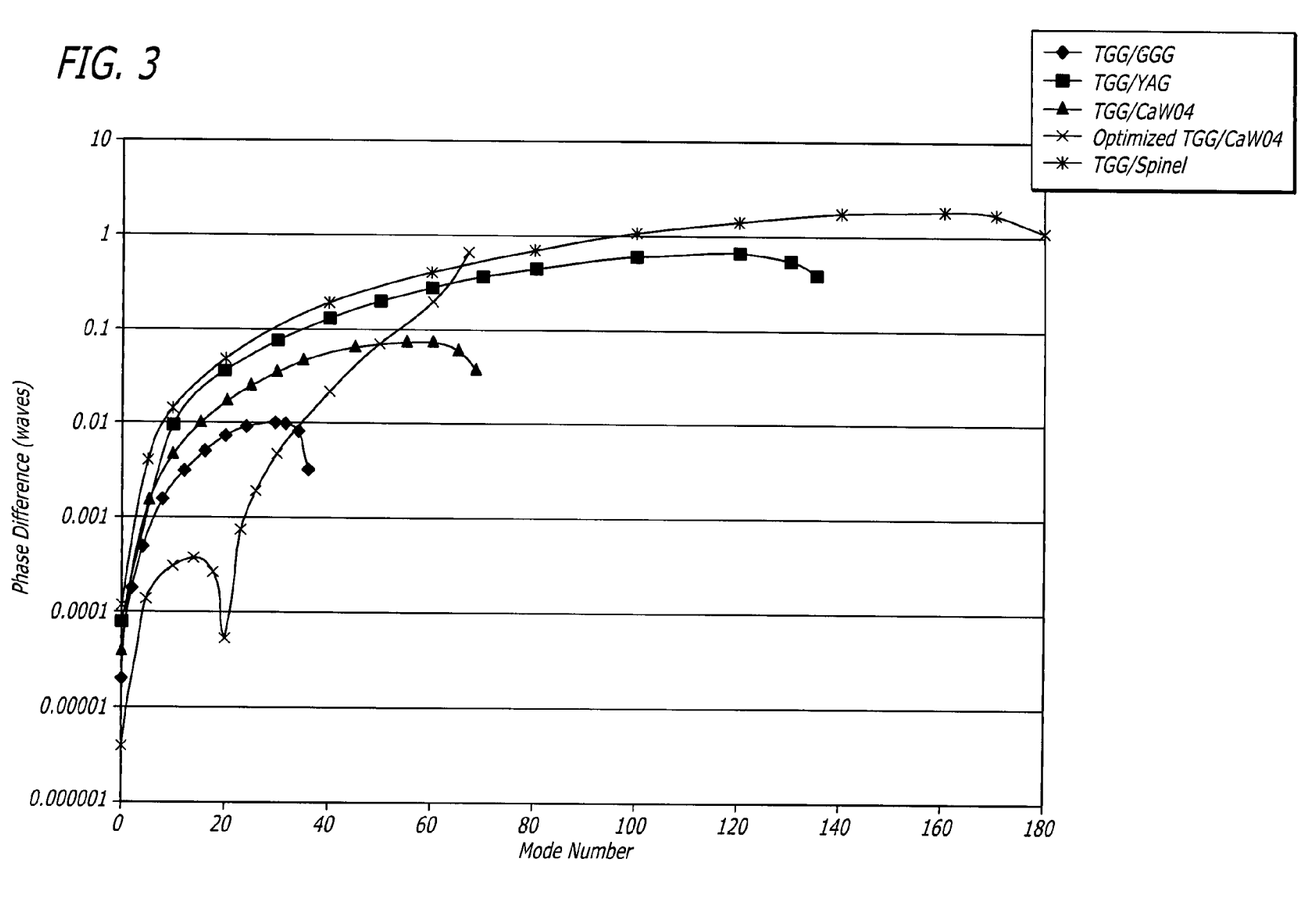
FIG. 3 is an exemplary graph of the phase difference for transmitted TE and TM modes as a function of mode number in a Planar Waveguide (PWG) Faraday Rotator with a 100 micron Terbium Gallium Garnet (TGG) core and various claddings.

FIG. 3 is an exemplary graph of the phase difference as a function of mode number for TM and TE modes in a PWG Faraday Rotator with a 100 micron TGG core and various claddings. The YAG and Spinel claddings have a relatively large index difference relative to the core and for higher order modes the mode propagation velocities differ enough to cause adverse effects. For example, to maintain an extinction ratio of 20 db, the phase difference between TE and TM modes should be less than 0.03 waves. To maintain an extinction ratio of 30 db, the phase difference between TE and TM modes should be less than 0.01 waves.

For applications where only a single guided mode or just a few guided modes must be propagated in the PWG Faraday rotator, a TGG PWG with even a moderately large core/cladding index difference, up to 0.2 or more, should provide an adequately low TE/TM mode phase difference to be used as a Faraday Rotator. When higher order modes must be propagated, a low index difference between the core and cladding should sufficiently equalize the propagation velocities for TE and TM modes. In this case, the core: cladding index difference should be on the order of 0.01 or less. Index differences in this range may be achieved by selection of core and cladding materials with appropriate properties. Engineered approaches using the same core and cladding material may also be produced by adding low concentrations of a passive dopant to the core and/or cladding of the PWG to modify the refractive index.

Figure 4:
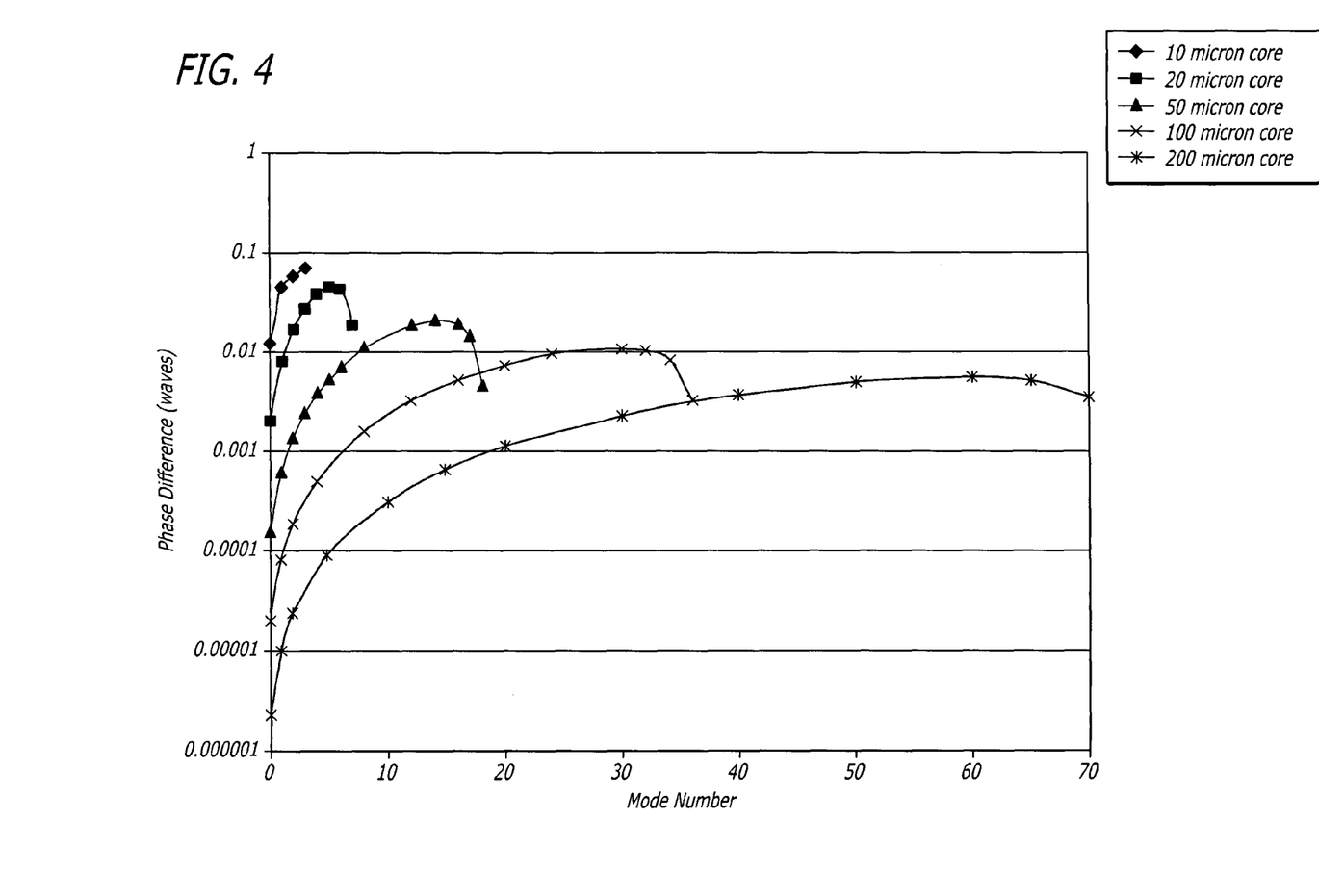
FIG. 4 is an exemplary graph showing the phase difference for transmitted TE and TM modes in a PWG with a TGG core and Gadolinium Gallium Garnet (GGG) claddings having a relatively small index difference, about 0.009, at a number of different core thicknesses.

FIG. 4 is an exemplary graph showing the phase difference for TM and TE modes in a PWG with a TGG core and GGG claddings having a relatively small index difference, about 0.009, at a number of different core thicknesses. For low order modes, there is a negligible difference between the effective index for TE and TM modes for cores thicker than about 20 microns. The performance even for high order modes appears to be very good for core sizes in the range of 100-200 microns.

For applications where a highly multimode beam must be transmitted by the PWG Faraday rotator 10 of the present invention, equalization of the mode propagation velocities can be achieved by utilizing birefringent claddings and tuning the orientation of each birefringent cladding until the TE and TM propagation velocities are sufficiently equalized for the range of modes to be used in the PWG. Selection of cladding materials with the appropriate CTE to facilitate fabrication of a PWG and the optimal index and birefringence to equalize the propagation velocities can be challenging but several possible candidates exist for use with a TGG core.

Figure 5:
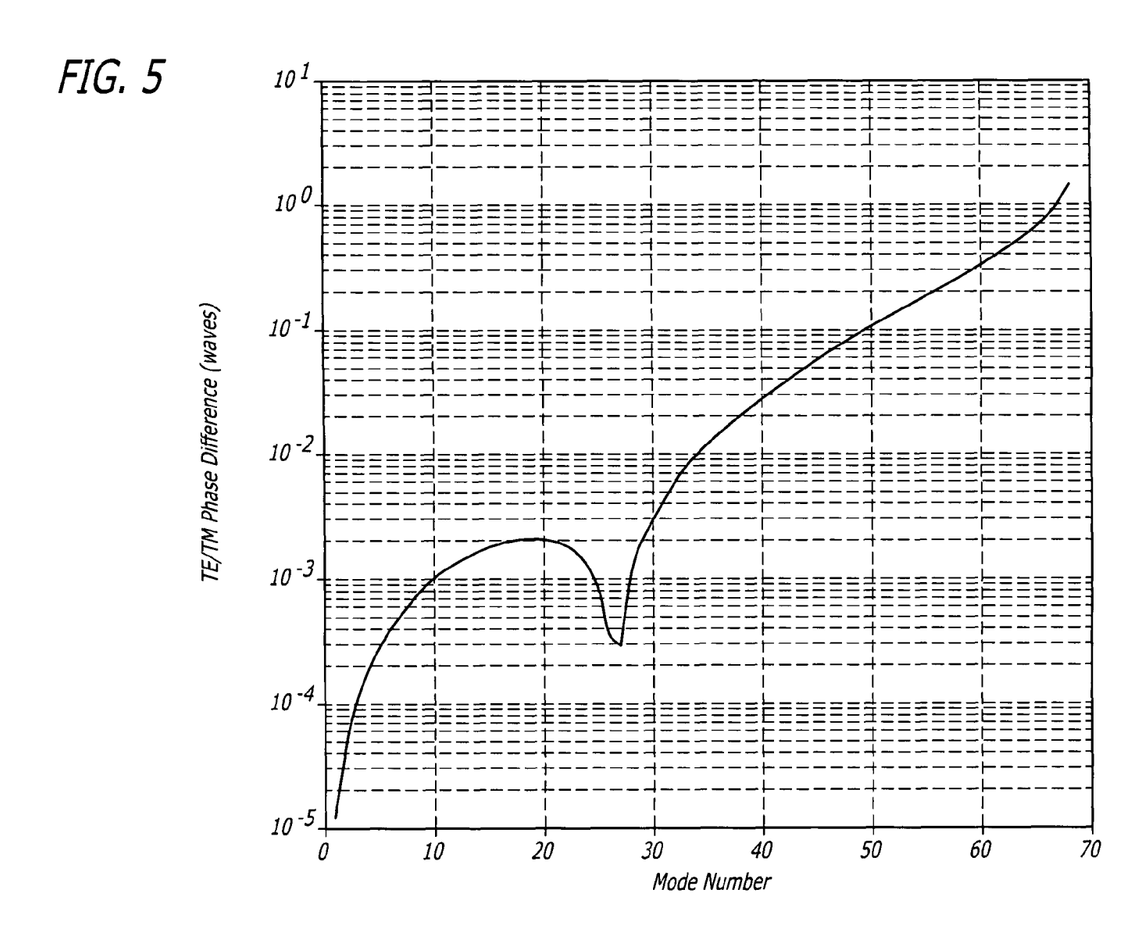
FIG. 5 is an exemplary graph showing the phase difference for TE and TM modes in a PWG with a TGG core and Calcium Tungstate (CaWO4) claddings whose orientation has been optimized to minimize the difference between the effective index for TE and TM modes over a relatively broad range of modes.

FIG. 5 is an exemplary graph showing the phase difference for TM and TE modes in a PWG with a TGG core and CaWO4 claddings whose orientation has been optimized to minimize the difference between the effective index for TE and TM modes over a relatively broad range of modes.

Optimization of the orientation of the birefringent cladding is relatively sensitive but not beyond typical fabrication tolerances of course of ordinary skill in the art.

Figure 6:
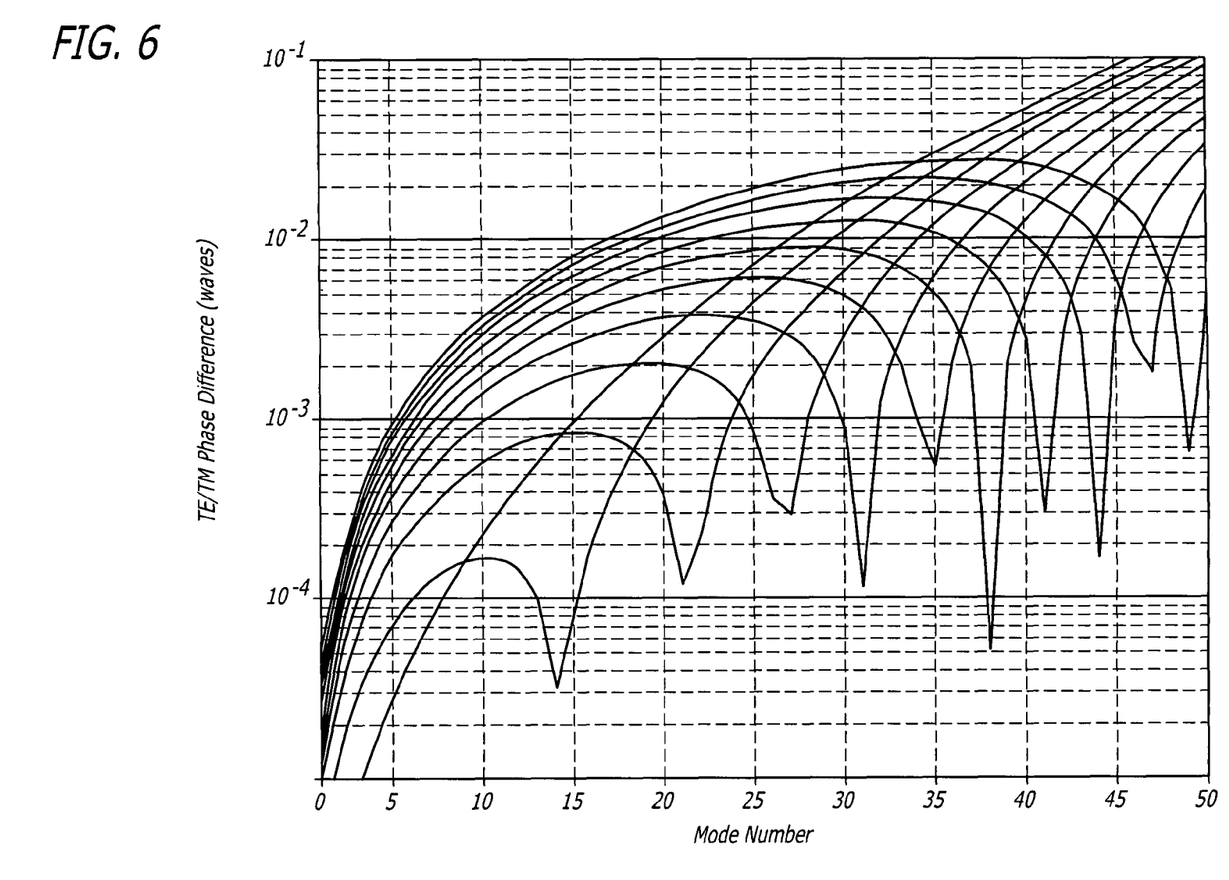
FIG. 6 is an exemplary set of curves that show the calculated TE/TM phase difference for a number of different cladding refractive indices for the TM mode.

FIG. 6 is an exemplary set of curves that show the calculated TE/TM phase difference for a number of different cladding refractive indices for the TM mode. This index range corresponds to tuning the optical axis of the birefringent cladding over a range from 15° to 21° relative to the axis of the PWG.

In addition to minimizing the difference between TE and TM mode propagation velocities, the PWG Faraday isolator must also minimize the temperature rise in the core and minimize stress-induced birefringence in order to maintain high extinction at high power. Fortunately, the PWG geometry also achieves these goals quite easily. The large surface area to volume ratio allows efficient cooling, minimizing temperature rise in the core and keeping stresses in the crystal very low. A notional 100 kW PWG Faraday rotator might use a 200 micron TGG core with GGG claddings, a width of 5 cm and a length of 2 cm. Absorption in TGG is 0.15%/cm resulting in a 150 W/cm heat load and a heat flux on the cooled surfaces of 15 W/cm2. The total thickness of the core and claddings might be 2 mm yielding a temperature rise between the center of the core and the surface of the PWG of only 2.2° C. This small temperature rise would keep stress levels low resulting in negligible stress-induced birefringence and would avoid significant changes in the Faraday rotation due to the temperature dependence of the Verdet constant.

Figure 7:
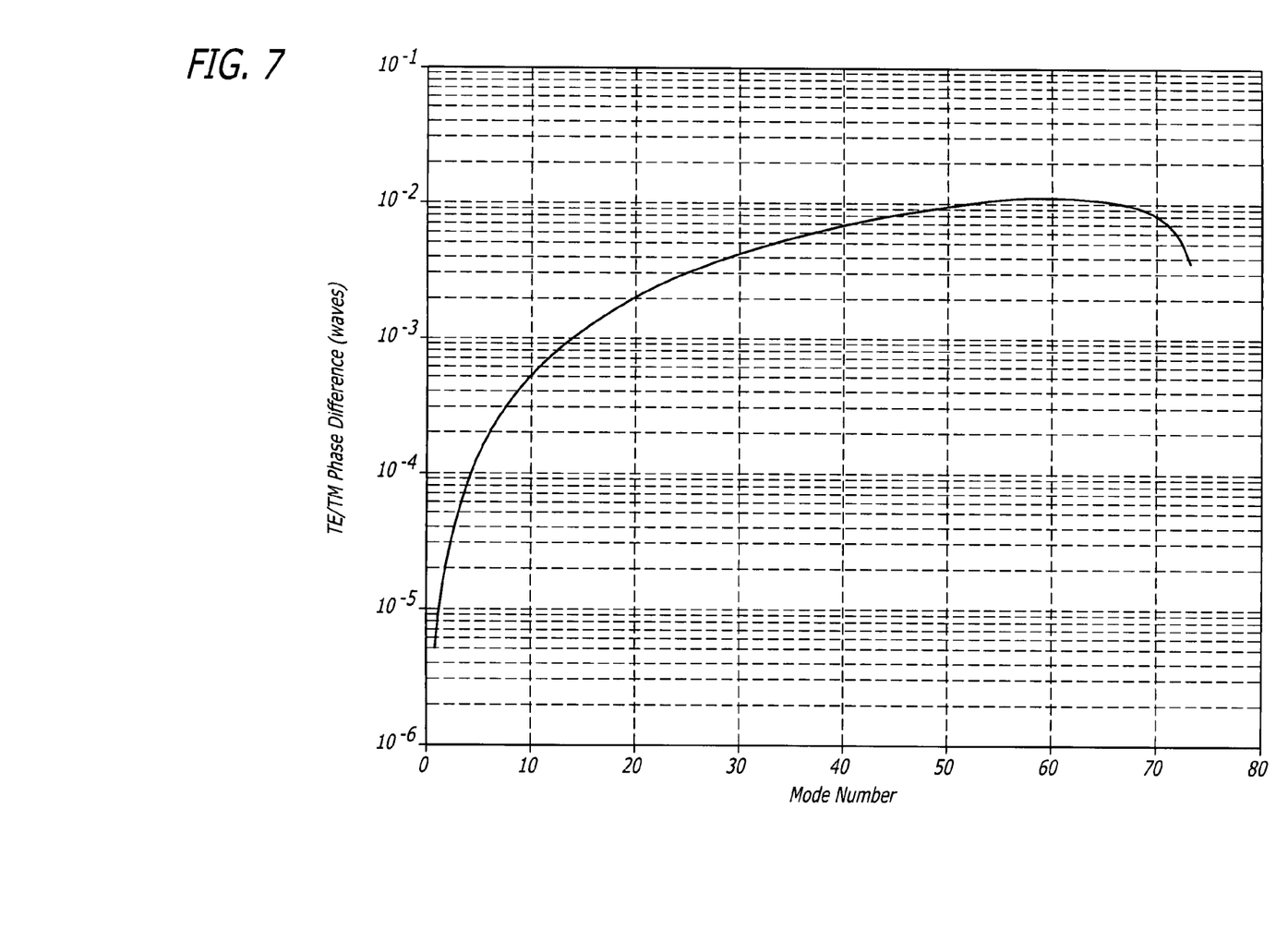
FIG. 7 is a graph showing expected performance for an illustrative implementation of a Faraday rotator in accordance with the present teachings.

FIG. 7 is a graph showing expected performance for an illustrative implementation of a Faraday rotator in accordance with the present teachings. The present invention of a PWG Faraday rotator optimized for low TE/TM propagation velocity difference provides a credible path to creating Faraday isolators with power handling up to HEL power levels. This type of device would be very useful in high gain Master Oscillator/Power Amplifier (MOPA) systems utilizing PWG amplifiers but is also generally useful for any high power laser system. The optimal design for most applications is probably a 200 micron TGG core with GGG claddings. The length of the device would be on the order of 20 mm for the magnetic field strengths typically used. TGG and GGG have good bonding compatibility and good availability. This device should be capable of handling 100 kW or more.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A Faraday rotator comprising:
a planar core; and
a birefringent cladding disposed on opposite sides of the planar core,
wherein a refractive index and the birefringence of the birefringent cladding are optimized to provide equal mode propagation velocities for both TE and TM modes for at least one transverse mode, and wherein for each transverse mode number less than 30, a phase difference between TE and TM modes is less than $3 \times 10^{-3}$ waves.

2. The Faraday rotator of claim 1, wherein the Faraday rotator comprises a very low numerical aperture planar waveguide.

3. The Faraday rotator of claim 1, wherein the refractive index and birefringence of the birefringent cladding are optimized to provide equal mode propagation velocities for both TE and TM modes for a wide range of transverse modes.

4. The Faraday rotator of claim 1, wherein the Faraday rotator has a thickness, a length that is 10 times the thickness, and a width that is 25 times the thickness.

5. The Faraday rotator of claim 1, wherein a thickness of the Faraday rotator is 2 millimeters.

6. The Faraday rotator of claim 1, wherein an optical axis of the birefringent cladding is tuned over a range from 15 to 21 degrees relative to an optical axis of the Faraday rotator.

7. A Faraday rotator comprising:
a planar core; and
a cladding disposed on opposite sides of the planar core, wherein the cladding disposed on at least one side of the planar core comprises a birefringent material, and wherein an optical axis of the cladding is tuned over a range from 15 to 21 degrees relative to an optical axis of the Faraday rotator such that for each transverse mode number less than 30, a phase difference between TE and TM modes is less than $3 \times 10^{-3}$ waves.

8. The Faraday rotator of claim 7, wherein the Faraday rotator has a thickness, a length that is 10 times the thickness, and a width that is 25 times the thickness.

9. The Faraday rotator of claim 7, wherein the Faraday rotator comprises a very low numerical aperture planar waveguide.

10. The Faraday rotator of claim 7, wherein a refractive index of the cladding is optimized to provide equal mode propagation velocities for both TE and TM modes for at least one transverse mode.

11. The Faraday rotator of claim 7, wherein a thickness of the Faraday rotator is 2 millimeters.

* * * * *